US010694439B2

(12) United States Patent
Mukherjee et al.

(10) Patent No.: US 10,694,439 B2
(45) Date of Patent: Jun. 23, 2020

(54) SYSTEMS AND METHODS FOR ASSIGNMENT OF MULTI-ACCESS EDGE COMPUTING RESOURCES BASED ON NETWORK PERFORMANCE INDICATORS

(71) Applicant: Verizon Patent and Licensing Inc., Arlington, VA (US)

(72) Inventors: Amitav Mukherjee, Elk Grove, CA (US); Patricia R. Chang, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/188,760

(22) Filed: Nov. 13, 2018

(65) Prior Publication Data

US 2020/0154459 A1  May 14, 2020

(51) Int. Cl.
*H04W 36/08* (2009.01)
*H04W 72/12* (2009.01)
*H04L 29/06* (2006.01)
*H04W 8/08* (2009.01)

(52) U.S. Cl.
CPC ......... *H04W 36/08* (2013.01); *H04L 63/0892* (2013.01); *H04L 65/1016* (2013.01); *H04L 65/1036* (2013.01); *H04W 8/08* (2013.01); *H04W 72/1257* (2013.01)

(58) Field of Classification Search
CPC .............. H04W 36/08; H04W 72/1257; H04L 65/1016; H04L 65/1036
See application file for complete search history.

(56) References Cited

U.S. PATENT DOCUMENTS

| | | | |
|---|---|---|---|
| 2016/0095041 A1* | 3/2016 | Agrawal | H04W 76/10 370/332 |
| 2016/0380907 A1* | 12/2016 | Zhu | H04L 67/1008 709/201 |
| 2018/0115934 A1* | 4/2018 | Chen | H04W 36/18 |
| 2018/0295546 A1* | 10/2018 | Crawford | H04L 67/104 |
| 2019/0075501 A1* | 3/2019 | Chen | H04L 41/0896 |
| 2019/0141593 A1* | 5/2019 | Wei | H04W 36/12 |
| 2019/0174369 A1* | 6/2019 | Tomikawa | H04L 65/608 |
| 2019/0191341 A1* | 6/2019 | Trang | H04W 4/50 |
| 2019/0191344 A1* | 6/2019 | Wen | G06F 9/45558 |
| 2019/0208449 A1* | 7/2019 | Wang | H04W 36/08 |
| 2019/0268812 A1* | 8/2019 | Li | H04W 8/08 |
| 2019/0274081 A1* | 9/2019 | Furuichi | H04W 88/08 |
| 2019/0342797 A1* | 11/2019 | Fu | H04W 24/04 |

* cited by examiner

*Primary Examiner* — Gary Mui

(57) ABSTRACT

A wireless communication device (WCD) may receive resource utilization values indicating an amount of available resources of server devices that are capable of sharing resources to support a session of an application. The WCD may generate performance scores for base station-server device groupings that are candidates for being selected as a target base station and a target server device. The WCD may select the target base station and the target server device based on the set of performance scores. The WCD may cause the session to be established in a manner that allows resources of the target server device to support the session of the application.

20 Claims, 11 Drawing Sheets

Example Link Performance Values
- Reference Signal Received Power (RSRP)
- Reference Signal Received Quality (RSRQ)
- Signal-To-Interference Plus Noise Ratio (SINR)
- Receive Signal Strength Indicator (RSSI)

116
Determine link performance values

UE 102

Combinations of Candidates to Select as Target Base Station and Target MEC Platform
- Base Station A-MEC Platform A
  - RU Value
  - Link Performance Value
- Base Station B-MEC Platform B
  - RU Value
  - Link Performance Value
- Base Station C-MEC Platform B
  - RU Value
  - Link Performance Value
- Base Station C-MEC Platform C
  - RU Value
  - Link Performance Value
- Base Station D-MEC Platform C
  - RU Value
  - Link Performance Value 118
Select target base station and target MEC platform based on an analysis of the RU values and the link performance values

SYSTEMS AND METHODS FOR ASSIGNMENT OF MULTI-ACCESS EDGE COMPUTING RESOURCES BASED ON NETWORK PERFORMANCE INDICATORS

BACKGROUND

In a multi-access edge computing (MEC) environment, computing is enabled by a network architecture that provides computing capabilities, to a user device, via computing platforms at or near an edge of a network (e.g., a wireless communication network). Accordingly, because a MEC environment may provide computing at or near the edge of the network, increased performance may be achieved over networks that may be topologically and/or physically further from a user device than a MEC environment. Such increased performance may be achieved in the MEC environment due to less traffic and/or congestion between a user device and the computing platform, less latency (due to the closer proximity), increased flexibility (due to a greater amount of computing platforms), and/or the like.

BRIEF DESCRIPTION OF THE DRAWINGS

FIGS. 1A-1F are diagrams of an example implementation described herein.

DETAILED DESCRIPTION OF PREFERRED EMBODIMENTS

Figure 1A:
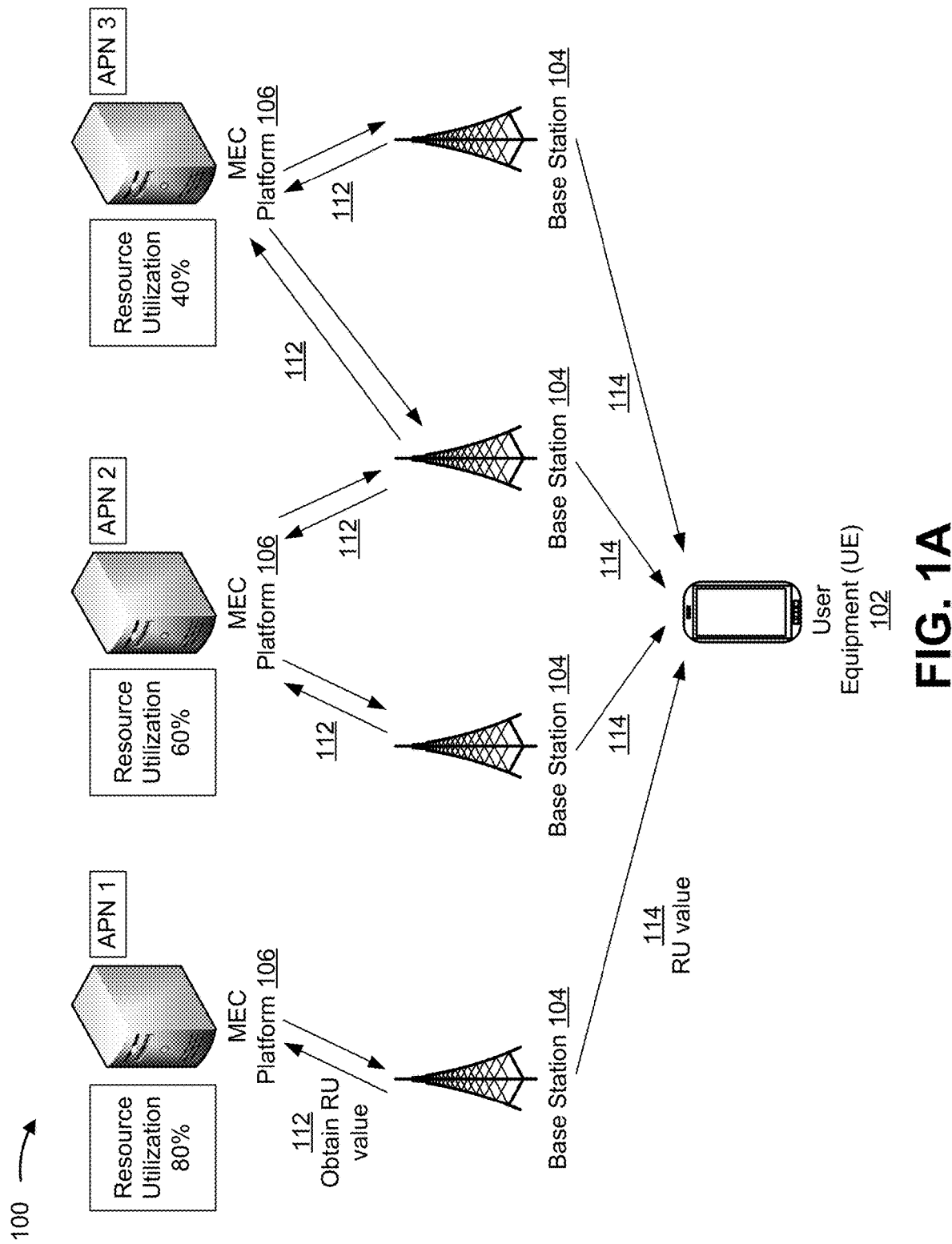

The following detailed description of example implementations refers to the accompanying drawings. The same reference numbers in different drawings may identify the same or similar elements.

In some instances, an application (referred to herein as a multi-access edge computing (MEC) application) may utilize both resources of a user device and resources of a cloud environment (e.g., resources of a server device in the cloud environment) while the application is running. Examples of a MEC application include any application requiring low latency or increased processing power, such as augmented reality applications, virtual reality applications, image processing applications (e.g., which include mapping, security, and/or the like), autonomous vehicle control applications (e.g., which include high definition (HD) mapping, safety infrastructure, and/or the like), and/or the like. In some cases, most or all of the processing of the MEC application may be offloaded to the cloud environment because the user device may not have the resources (e.g., processing resources, memory resources, etc.) to perform the processing, and the user device may simply display information provided from the cloud environment. In other cases, the processing may be split between the user device and the cloud environment according to a pre-configured distribution of processes of the application as defined by a configuration of the application. In still other applications, processing may be split further between, cloud, user device and network servers.

In a network topology that uses MEC, the resources of the cloud environment may be placed at or near devices located at an edge of a network. The resources may then be used to service a MEC application in a manner that is more efficient than a traditional network or cloud architecture whereby the resources and user equipment (UE) have to send traffic via a core of the network.

In many cases, when the UE connects to the network, the UE may be in a communication range or a service area that includes a group of base stations (e.g., eNodeBs, gNodeBs, etc.) and a group of MEC platforms that may assist the UE in sharing resources of the MEC application. However, in these cases, the UE and/or a base station may be unable to identify and select a preferred base station and MEC platform (e.g., a base station with a high-quality connection to the UE, a MEC platform with a sufficient amount of resources available to share, and/or the like). Furthermore, when the session is active and the UE is moving within the communication range or the service area, a servicing base station may be unable to perform a handover procedure in a way that is able to select the preferred base station and MEC platform (e.g., which may be a different base station and MEC platform than what was selected when the UE connected to the network).

Some implementations described herein provide a UE (or a base station) to select a target base station and a target MEC platform to support (e.g., devote resources to) a session of a MEC application based on an analysis of network performance indicators associated with a group of base stations and a group of MEC platforms that are candidates to support the session. For example, the group of MEC platforms may be located at an edge of a wireless communication network and may be candidates for supporting the session of the MEC application. In this case, while the UE is within a communication range of the group of base stations (e.g., a range in which the UE and group of base stations are close enough to send and/or receive signals), the group of base stations may provide the UE with a set of resource utilization (RU) values that indicate an amount of resources that the group of MEC platforms have available for sharing (and/or a total amount of resources being consumed by other MEC applications).

Additionally, the UE may determine a set of link performance values for links (e.g., physical connections, virtual connections, logical connections, and/or the like) between the UE and each of the group of base stations. Furthermore, the UE may select the target base station and the target MEC platform based on an analysis of the set of RU values and the set of link performance values, as described further herein.

Furthermore, the UE may provide the target base station with a request to establish the session. The request may include an indication to select a particular MEC platform as the target MEC platform (e.g., by including an identifier of the target MEC platform in the request). This may cause the target base station to interact with one or more network devices to establish the session of the MEC application. In some implementations, one or more steps described as being performed by the UE may be performed by one or more of the group of base stations. Additionally, or alternatively, one or more techniques described herein may be used to perform a handover procedure that allows the session to be supported by a new target base station and/or a new target MEC platform, as described further herein.

In this way, the UE intelligently selects a target base station and a target MEC platform based on an analysis of the resources available to the group of MEC platforms and link performance of the links associated with the group of base stations. By intelligently selecting the target base station and the target MEC platform, the UE ensures that the target MEC platform supporting the session has a sufficient amount of resources available. This allows the UE to offload processes of the application to the target MEC platform, thereby conserving resources (e.g., processing resources, network resources, and/or the like) that would otherwise be used to attempt to support the session without the resources of the target MEC platform (or without a portion of the resources of the target MEC platform).

Furthermore, the UE conserves its own limited resources and/or one or more network devices (e.g., the target base station, the target MEC platform, and/or the like) relative to a network solution that does not select the target base station and the target MEC platform based on an analysis of the set of RU values and the set of link performance values. For example, the UE conserves processing and communication resources that would otherwise be used to send packets that may be dropped or delayed during the session (e.g., as a result of poor load balancing of available MEC platform resources), to re-send packets that were dropped due to performance related issues, to perform error correction procedures based on the performance related issues, to perform load balancing operations independent of techniques described herein, and/or the like.

FIGS. 1A-1F are diagrams of an example implementation 100 described herein. Example implementation 100 may include a user equipment (UE) 102, a group of base stations 104, a group of multi-access edge computing (MEC) platforms 106 that are located at an edge of a wireless communication network, an EPC layer 108 that includes network devices that are part of a core of the wireless communication network (e.g., a mobility management entity (MME), a serving gateway (SGW), a packet data network gateway (PGW), etc.), and a MEC application server 110. In some implementations, EPC layer 108 may include one or more functional elements of a fifth generation (5G) network, such as a network slice selection function (NSSF), a network exposure function (NEF), an authentication server function (AUSF), a unified data management (UDM) component, a policy control function (PCF), an application function (AF), an access and mobility management function (AMF), a session management function (SMF), a user plane function (UPF), a data network, and/or the like.

As shown in FIGS. 1A-1F, one or more of the above-mentioned devices may perform actions to intelligently select a target base station 104 and a target MEC platform 106 that are to support (e.g., devote resources to) a session of a MEC application. A MEC application, as used herein, may refer to an application that may utilize both resources of UE 102 and resources of target MEC platform 104. The session may be a communication session, a data session, an internet protocol (IP) session, and/or the like. The wireless communication network may be a fifth generation (5G) network, a fourth generation (4G) long term evolution (LTE) network, and/or a similar type of network.

As shown in FIG. 1A, and by reference number 112, the group of base stations 104 may obtain a set of resource utilization (RU) values from the group of MEC platforms 106. For example, the group of base stations 104 may be in a communication range of UE 102 and may obtain a set of RU values from the group of MEC platforms 106. One or more MEC platforms 106 (e.g., the group of MEC platforms 106, a portion of the group of MEC platforms 106), etc.), may be located at or near an edge of the wireless communication network, which, as used herein, may refer to a location (e.g., a physical location, a virtual location, and/or the like) between UE 102 and the one or more network devices that are part of EPC layer 108.

The set of RU values may indicate an amount of resources that the group of MEC platforms 106 have available, an amount of resources available for supporting the session of the MEC application, a total amount of resources being consumed by the group of MEC platforms 106, and/or the like. The set of RU values may include a first value indicating a processing unit utilization rate for a MEC platform 106 (e.g., a central processing unit (CPU) utilization rate, a graphics processing unit (GPU) utilization rate, etc.), a second value indicating an amount of memory available to the MEC platform 106, a third value indicating an amount of capacity available to the MEC platform 106, a fourth value indicating an amount of latency associated with a connection to the MEC platform 106, an overall RU value indicating an average and/or a weighted average of one or more of the other RU values, and/or the like.

In some implementations, a base station 104 may obtain an RU value from a MEC platform 106. For example, base station 104 may provide a request for the RU value to MEC platform 106 which may cause MEC platform 106 to provide the RU value to base station 104. As shown as an example, a first base station 104 may obtain a first RU value indicating that a first MEC platform 106 has a resource utilization rate of 80%, a second base station 104 and a third base station 104 may obtain a second and a third RU value indicating that a second MEC platform 106 has a resource utilization rate of 60%, and the third base station 104 and a fourth base station 104 may obtain a fourth and a fifth RU value indicating that a third MEC platform 106 has a resource utilization rate of 40%.

In some implementations, a base station 104 may request the RU value based on a trigger. For example, base station 104 may request the RU value periodically, upon detecting UE 102 in a communication range of base station 104, based on a location of UE 102, and/or the like. In some implementations, a MEC platform 106 may automatically provide the RU value to base station 104 (e.g., based on a trigger).

In some implementations, a base station 104 may obtain one or more RU values and may analyze the one or more RU values in order to determine an overall RU value. For example, base station 104 may obtain, from a MEC platform 106, a first value indicating the processing unit utilization rate, a second value indicating the amount of available memory, and/or the like. In this case, base station 104 may analyze the one or more RU values to determine an overall RU value (e.g., that represents an average of the one or more RU values, a weighted average, and/or the like). Similarly, in some cases, base station 104 may provide the one or more RU values to UE 102, and UE 102 may analyze the one or more RU values to determine the overall RU value.

In some implementations, a MEC platform 106 may be part of a base station 104. For example, one or more server devices supporting functionality of MEC platform 106 may be hosted as part of base station 104 or at a site of base station 104. In this case, base station 104 may determine the RU value (rather than obtain the RU value from MEC platform 106 which may be located in a different physical location).

As shown by reference number 114, the group of base stations 104 may provide the set of RU values to UE 102. In some implementations, the group of base stations 104 may also provide UE 102 with a set of MEC identifiers that correspond to the set of RU values (e.g., such that UE 102 may identify which RU value is associated with which MEC platform 106). A MEC identifier may include an internet protocol (IP) address of a MEC platform 106, an access point name (APN) associated with MEC platform 106, and/or the like. In some implementations, UE 102 may request an RU value from a base station 104 (e.g., in a situation where base station 104 is not configured to automatically provide UE 102 with the RU value).

In this way, UE 102 is provided with the set of RU values that may be analyzed when selecting target base station 104 and target MEC platform 106, as described further herein.

As shown in FIG. 1B, and by reference number 116, UE 102 may determine a set of link performance values. For example, UE 102 may determine a link performance value for each link between UE 102 and the group of base stations 104. In some cases, UE 102 may determine the set of link performance values based on a trigger, such as an individual interacting with UE 102 to turn on a network connection, based on the individual interacting with UE 102 to launch the application, based on UE 102 receiving the set of RU values, and/or the like.

The set of link performance values may include a reference signal received power (RSRP) value, a reference signal received quality (RSRQ) value, a signal-to-interference plus noise ratio (SINR) value, a receive signal strength indicator (RSSI) value, an average or weighted average of one or more of these values, and/or the like. As an example, UE 102 may determine an RSRP value associated with a link between UE 102 and a base station 104. In this example, UE 102 may determine an RSRP value indicating an average power level of resource elements that carry reference signals within a measured frequency bandwidth.

As another example, UE 102 may determine an RSSI value associated with the link between UE 102 and a base station 104. In this example, UE 102 may determine an RSSI value indicating an average power level associated with an entire available frequency bandwidth (e.g., including power from co-channel serving and non-serving cells, adjacent interference, thermal noise, and/or the like).

As another example, UE 102 may determine an overall link performance value based on an average or a weighted average of multiple link performance values. In this example, UE 102 may determine an RSRP value, an RSRQ value, an SINR value, and/or an RSSI value, and may determine an average or weighted average value that may be used as the overall link performance value.

As shown by reference number 118, UE 102 may select target base station 104 and target MEC platform 106 based on an analysis of the set of RU values and the set of link performance values. For example, UE 102 may analyze an RU value associated with each MEC platform 106 and a link performance value associated with each base station 104 to determine which base station 104 and which MEC platform 106 to select as target base station 104 and target MEC platform 106.

In some implementations, UE 102 may select a MEC platform 106 as target MEC platform 106 based on an RU value satisfying a threshold RU value. For example, the RU value may identify an amount of resources available to MEC platform 106 and UE 102 may determine that the RU value satisfies the threshold RU value. The threshold RU value may be set to a value that ensures that a MEC platform 106 that is selected as target MEC platform 106 has a sufficient amount of resources available to share when supporting the session of the MEC application. In this way, UE 102 is able to select target MEC platform 106 based on the RU value satisfying the threshold RU value.

Additionally, or alternatively, UE 102 may select a base station 104 as target base station 104 based on a link performance value satisfying a threshold link performance value. For example, the link performance value may serve as a performance metric for a link between base station 104 and UE 102, and UE 102 may determine that the link performance value satisfies the threshold link performance value. The threshold link performance value may be set to a value that ensures that the link is of a sufficient quality to support the session of the MEC application (e.g., without dropping a connection, without a signal quality dropping below a threshold value, and/or the like). In this way, UE 102 is able to select target base station 104 based on the link performance value satisfying the threshold link performance value.

In some implementations, UE 102 may select a base station 104 as target base station 104, and a MEC platform 106 as target MEC platform 106, based on a set of performance scores. For example, UE 102 may perform a scoring technique to generate a set of performance scores for base stations 104 and MEC platforms 106 that are candidates for being selected as target base station 104 and target MEC platform 106, respectively, and may select a base station 104 and a MEC platform 106 with a best-available performance score. The set of performance scores may be based on a first set of scores indicating whether the set of RU values satisfy the threshold RU value, a second set of scores indicating a degree to which the set of RU values satisfy the threshold RU value, a third set of scores indicating whether the set of link performance values satisfy the threshold link performance value, a fourth set of scores indicating a degree to which the set of link performance values satisfy the threshold link performance value, a score (or a value) indicating an amount of resources that target MEC platform 106 must share in order to support the session, a weighted combination of two or more of the above-mentioned scores, and/or the like.

As an example, UE 102 may generate a first score based on whether an RU value associated with a MEC platform 106 satisfies the threshold RU value, and may generate a second score based on whether a link performance value associated with a base station 104 satisfies the threshold link performance value. Additionally, UE 102 may generate a performance score based on a weighted combination of the first score and the second score. UE 102 may do this analysis for RU values and link performance values associated with each combination of base station 104 and MEC platform 106 that are candidates for being selected as target base station 104 and target MEC platform 106, respectively, and may select a base station 104 and a MEC platform 106 that is associated with a best-available performance score.

The best-available performance score, in some cases, may be a highest-available value. For example, assume that a score of one is generated if an RU value satisfies the threshold RU value, that a score of zero is generated if the RU value does not satisfy the threshold RU value, that a score of one is generated if a link performance value satisfies the threshold link performance value, and that a score of zero is generated if the link performance value does not satisfy the threshold link performance value. In this example, a base station 104 and a MEC platform 106 with an RU value and a link performance value that satisfies both threshold values would receive a score of two, where another base station 104 and MEC platform 106 that included an RU value that did not satisfy the threshold RU value or a link performance value that did not satisfy the threshold link performance value would only receive a score of one. These score values are, of course, provided only as illustrative examples; any suitable values may be used.

Additionally, or alternatively, and provided as another example, UE 102 may generate a performance score by taking a weighted combination of scores. For example, assume that UE 102 generates a first score of one and a second score of zero for a first base station 104 and MEC platform 106 (i.e., a first RU value satisfied the threshold RU value and a first link performance value did not satisfy the threshold link performance value). Further assume that UE 102 generates a first score of zero and a second score of one for a second base station 104 and MEC platform 106 (i.e., a second RU value did not satisfy the threshold RU value and a second link performance value did satisfy the threshold link performance value). In this case, UE 102 may assign a first weight to each of the first scores, may assign a second weight to each of the second scores, and may generate a first performance score for the first base station 104 and MEC platform 106 and a second performance score for the second base station 104 and MEC platform 106 based on the weighted combination of the first score and the second score. In this way, if the first base station 104 and MEC platform 106 have a preferred RU value (relative to the second base station 104 and MEC platform 106) and the second base station 104 and MEC platform 106 have a preferred link performance value (relative to the first base station 104 and MEC platform 106), UE 102 may use the weighted values to determine whether to select the first base station 104 and MEC platform 106 or the second base station 104 and MEC platform 106.

Additionally, or alternatively, and provided as another example, UE 102 may generate a performance score that accounts for a degree to which an RU value satisfies the threshold RU value and/or a degree to which a link performance value satisfies the threshold link performance value. For example, UE 102 may generate a first value representing a degree to which the RU value satisfies the threshold RU value and a second value representing a degree to which the link performance value satisfies the threshold link performance value. In this case, UE 102 may generate a performance score based on the first value and the second value.

Additionally, or alternatively, and provided as another example, UE 102 may generate a performance score that accounts for an amount of resources that target MEC platform 106 is to share (or is predicted to share) when supporting the session of the MEC application. For example, different applications executed on MEC may require a supporting MEC platform 106 to share different amounts of resources, which may influence selecting a best-available MEC platform 106 for supporting a particular application. In this case, UE 102 may determine the amount of resources that target MEC platform 106 is to share (or is predicted to share) based on a configuration indicating a predetermined amount of resources that are to be shared, based on an average amount of resources that were shared for past users of the MEC application, and/or the like. Additionally, UE 102 may generate a performance score based on the amount of resources that target MEC platform 106 is to share or is predicted to share (e.g., which may be considered in conjunction with one or more scores described above). In some cases, the threshold RU value may be set based on the amount of resources that target MEC platform 106 is to share or is predicted to share.

In the example shown in FIG. 1B, UE 102 may consider five possible combinations of base stations 104 and MEC platforms 106 that may be selected as target base station 104 and target MEC platform 106. For example, UE 102 may consider whether to select Base Station A and MEC Platform A, Base Station B and MEC Platform B, Base Station C and MEC Platform B, Base Station C and MEC Platform C, and Base Station D and MEC Platform C. In this example (as shown by the underlined base station and MEC platform), UE 102 may select Base Station C and MEC Platform C as target base station 104 and target MEC platform 106 (e.g., based on an analysis of the set of RU values and the set of link performance values, using one or more techniques described above). While one or more implementations may describe UE 102 as selecting one target base station 104 and one target MEC platform 106, in practice, UE 102 may select multiple target base stations 104 and/or multiple target MEC platforms 106 to support the session of the MEC application.

In this way, UE 102 selects target base station 104 and target MEC platform 106 based on an analysis of the set of RU values and the set of link performance values. This conserves resources (e.g., processing resources, computing resources, network resources, and/or the like) relative to selecting target base station 104 and target MEC platform 106 without considering resources that are available to the group of MEC platforms 106. For example, without selecting target base station 104 and/or target MEC platform 106 based on the set of RU values, UE 102, target base station 104, and target MEC platform 106 may expend resources while the session is active, but may be more likely to drop packets, experience packet delay, experience higher latency, and/or the like, as a result of poor load balancing that occurred by selecting target MEC platform 106 without considering the set of RU values.

Figure 1C:
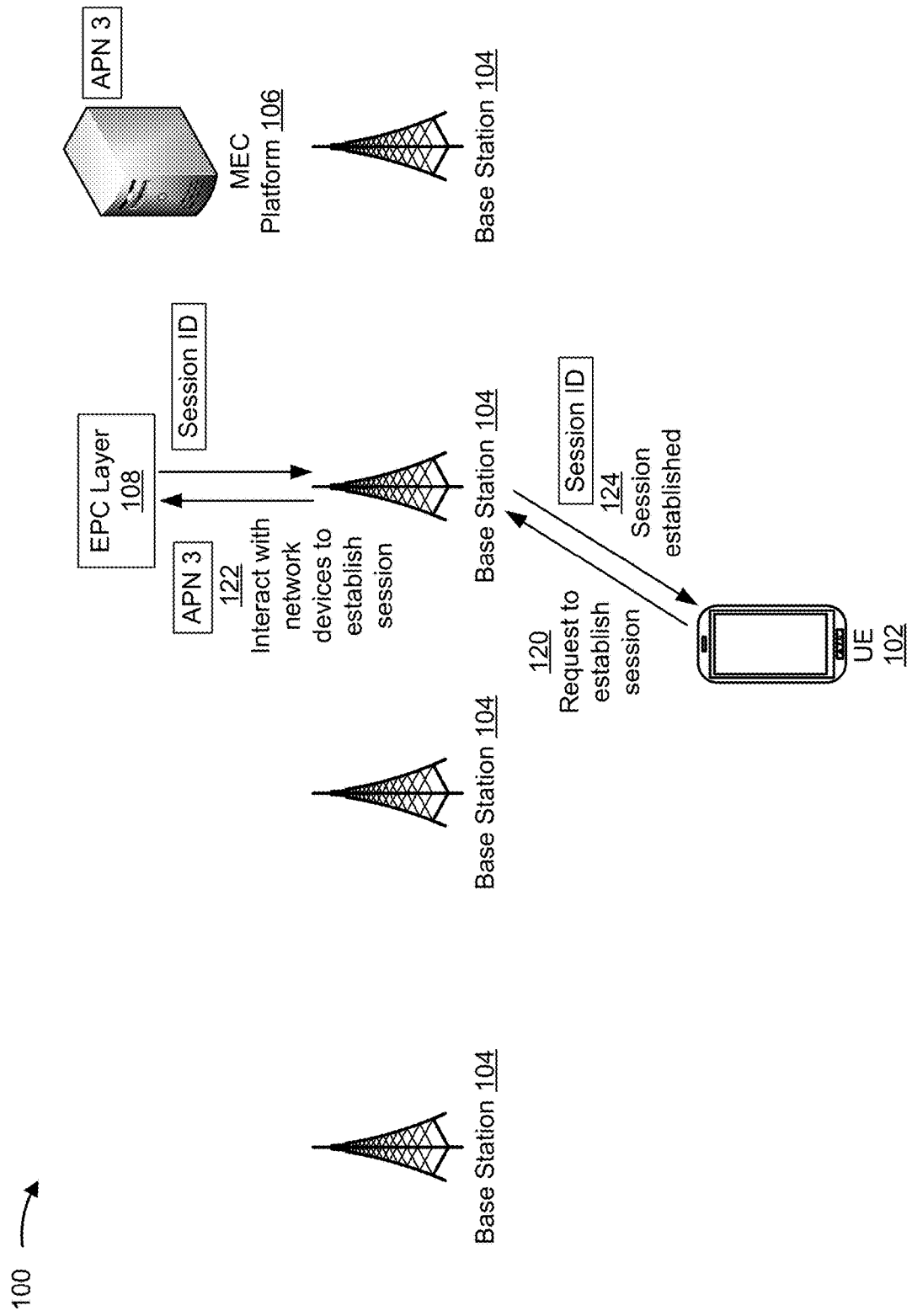

As shown in FIG. 1C, and by reference number 120, UE 102 may provide, to target base station 104 (also known as a serving base station 104), a request (e.g., an attachment request) to establish the session that will support traffic flow of the MEC application. The request may include an identifier of UE 102 (e.g., an IP address), an application identifier of the MEC application, an identifier of target MEC platform 106 (e.g., a MEC APN, such as APN 3), an identifier of a destination that may be an endpoint for traffic of the session (e.g., MEC application server 110, a peer device, etc.), one or more values associated with target base station 104 and target MEC platform 106 (e.g., the RU value, the link performance value, the performance score, a value used to generate the performance score, etc.), and/or the like.

In some implementations, a base station 104 (rather than UE 102) may select target base station 104 and target MEC platform 106. For example, the group of base stations 104 may include a base station 104 that has been assigned as a master base station 104, and master base station 104 may be tasked with selecting target base station 104 and target MEC platform 106. In this case, the group of base stations 104 may be configured to provide the set of RU values to master base station 104 (e.g., instead of to UE 102) and UE 102 may provide the set of link performance values to master base station 104 (or to an intermediary base station 104 that forwards the values to master base station 104). Additionally, master base station 104 may select target base station 104 and target MEC platform 106 based on an analysis of the set of RU values and the set of link performance values, using one or more techniques described above.

In some implementations, a base station 104 may be assigned to be master base station 104 based on a trigger or a rule. For example, a base station 104 may be assigned to be master base station 104 based on proximity to UE 102 (e.g., a closest base station 104 to UE 102 may be used as master base station 104). As another example, a base station 104 may be assigned to be master base station 104 randomly (e.g., by having UE 102 select one at random, etc.) or based on another rule.

In some implementations, the selection of target base station 104 and/or target MEC platform 106 (e.g., as made by UE 102) may be used as a recommendation for a base station 104 that receives the request to establish the session. For example, assume that UE 102 selects target base station 104 and target MEC platform 106, and provides target base station 104 with a request to establish the session. In this case, when target base station 104 receives the request, target base station 104 may use the selection made by UE 102 as a recommendation and may select itself as target base station 104 or may select another base station 104, may select a target MEC platform 106 recommended by UE 102, may select another MEC platform 106 as target MEC platform 106, and/or the like.

As an example, assume that an event (e.g., a sports event, etc.) has caused a large number of UEs 102 to connect to the wireless communication network over a short time period. In this example, a group of UEs 102 might all suggest to establish a connection with a first target base station 104 and target MEC platform 106, even if a more effective allocation of resources would be to assign the first target base station 104 and target MEC platform 106 to a first subset of the group of UEs 102 and to assign a second target base station 104 and target MEC platform 106 for a second subset of the group of UEs 102. In this case, a base station 104 that receives a request to establish a session from UE 102 may select target base station 104 and target MEC platform 106 using one or more techniques described herein. In this way, a flexible solution may be implemented that is able to efficiently and effectively utilize resources of UEs 102 and/or network devices (e.g., base stations 104, MEC platforms 106, devices in EPC layer 108, and/or the like).

As shown by reference number 122, target base station 104 may interact with one or more network devices of EPC layer 108 to establish the session of the MEC application. For example, target base station 104 may provide a first network device (e.g., the MME) with the identifier of target base station 104, the identifier of target MEC platform 106, the identifier of the destination device (e.g., MEC application server 110), and/or the like, which may allow the first network device to select one or more other network devices (e.g., the SGW, the PGW, etc.) to assist in establishing and/or supporting the session. As an example, the MME may use the identifier of target MEC platform 106 (shown as APN 3) to select the SGW and the PGW that are closest to target MEC platform 106. This may cause target base station 104 to receive an indication that the session has been established (e.g., by receiving a session identifier for the session), which, as shown by reference number 124, may cause target base station 104 to notify UE 102 that the session has been established (e.g., by providing UE 102 with the session identifier).

In this way, the session is established that permits traffic flow between UE 102, target base station 104, target MEC platform 106, and/or MEC application server 110 (e.g., using resources shared by target MEC platform 106).

Figure 1D:
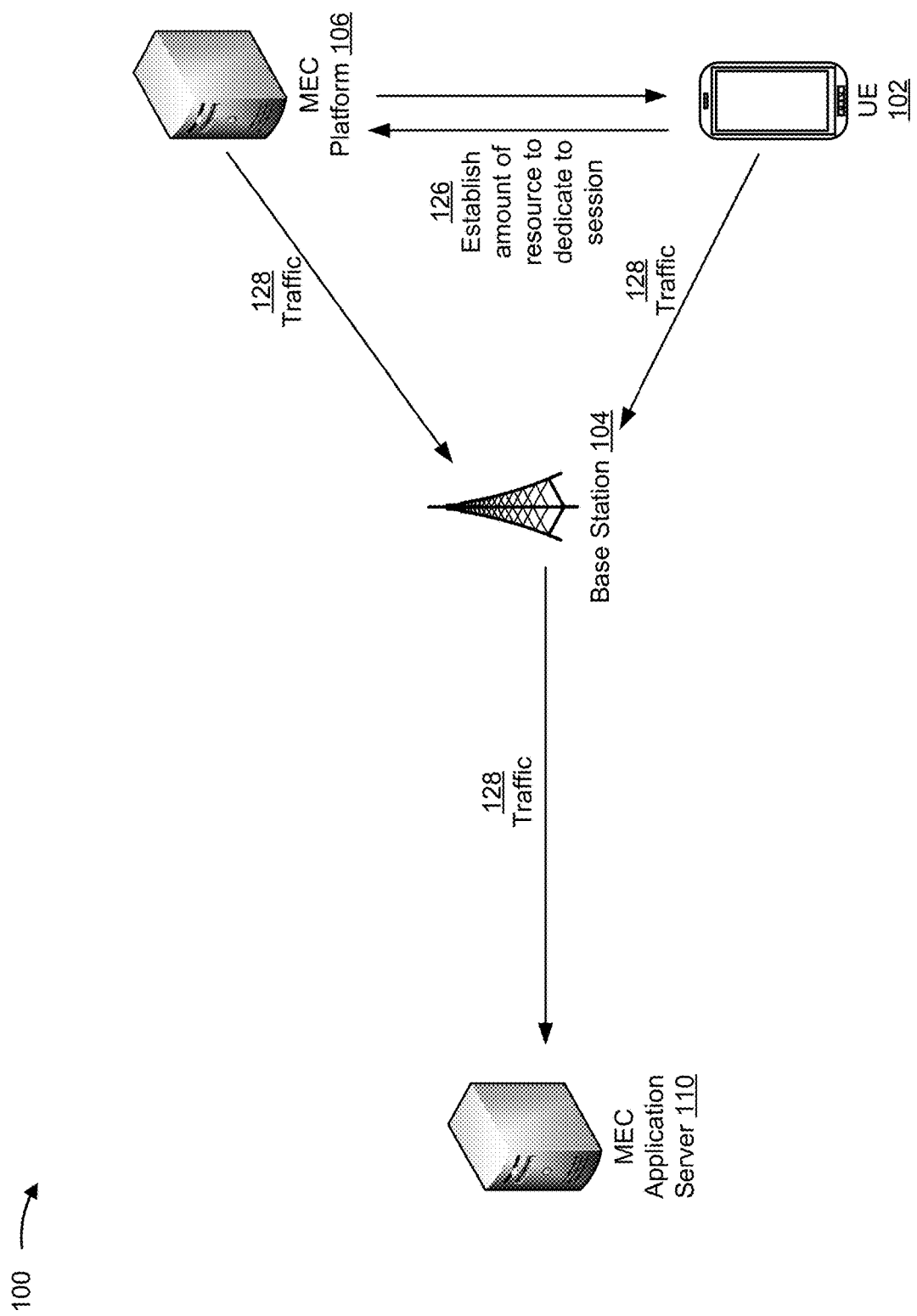

As shown in FIG. 1D, and by reference number 126, UE 102 and target MEC platform 106 may establish an amount of resources to dedicate to the session. This interaction may be performed using target base station 104 as an intermediary. In some implementations, UE 102 may provide instructions to target MEC platform 106 indicating which resources of UE 102 and which resources of target MEC platform 106 are to be used during the session. In some implementations, target MEC platform 106 may provide instructions to UE 102 indicating which resources of UE 102 and which resources of target MEC platform 106 are to be used during the session. In some implementations, UE 102 and/or target MEC platform 106 may modify a distribution of resources used during the session in real-time. In some implementations, UE 102 and/or target MEC platform 106 may be configured with an amount of resources to dedicate to the session or with a rule that may be used to determine the amount of resources to dedicate to the session.

As shown by reference number 128, UE 102 and/or target MEC platform 106 may provide traffic flow of the session to MEC application server 110. In this case, target base station 104 may identify the traffic as part of the MEC application based on the traffic flow including the session identifier, the identifier of target MEC platform 106, and/or the like.

In some implementations, UE 102 and target MEC platform 106 may perform separate processes associated with the application (which, as shown, may cause both devices to provide traffic flow to MEC application server 110). In some implementations, UE 102 may split performance of a process with target MEC platform 106. In this case, UE 102 may provide traffic flow for the process to target base station 104, and target base station 104 may need to wait for additional information from target MEC platform 106 or request the additional information from target MEC platform 106 before providing the traffic to MEC application server 110. While not shown it is to be understood that the session may involve two-way traffic flow (e.g., such that MEC application server 110 is able to provide traffic to target MEC platform 106 and/or to UE 102).

In some implementations, one or more network devices may change target base station 104 and/or target MEC platform 106. For example, the amount of resources available to the group of MEC platforms 106 may change over time as various other UEs 102 connect to the wireless communication network. In this case, a network device (e.g., target base station 104, a device that is part of EPC layer 108, and/or the like) may select a new target base station 104 and/or a new target MEC platform 106 using one or more techniques described herein.

In this way, UE 102 and target MEC platform 106 share resources to support the session.

Figure 1E:
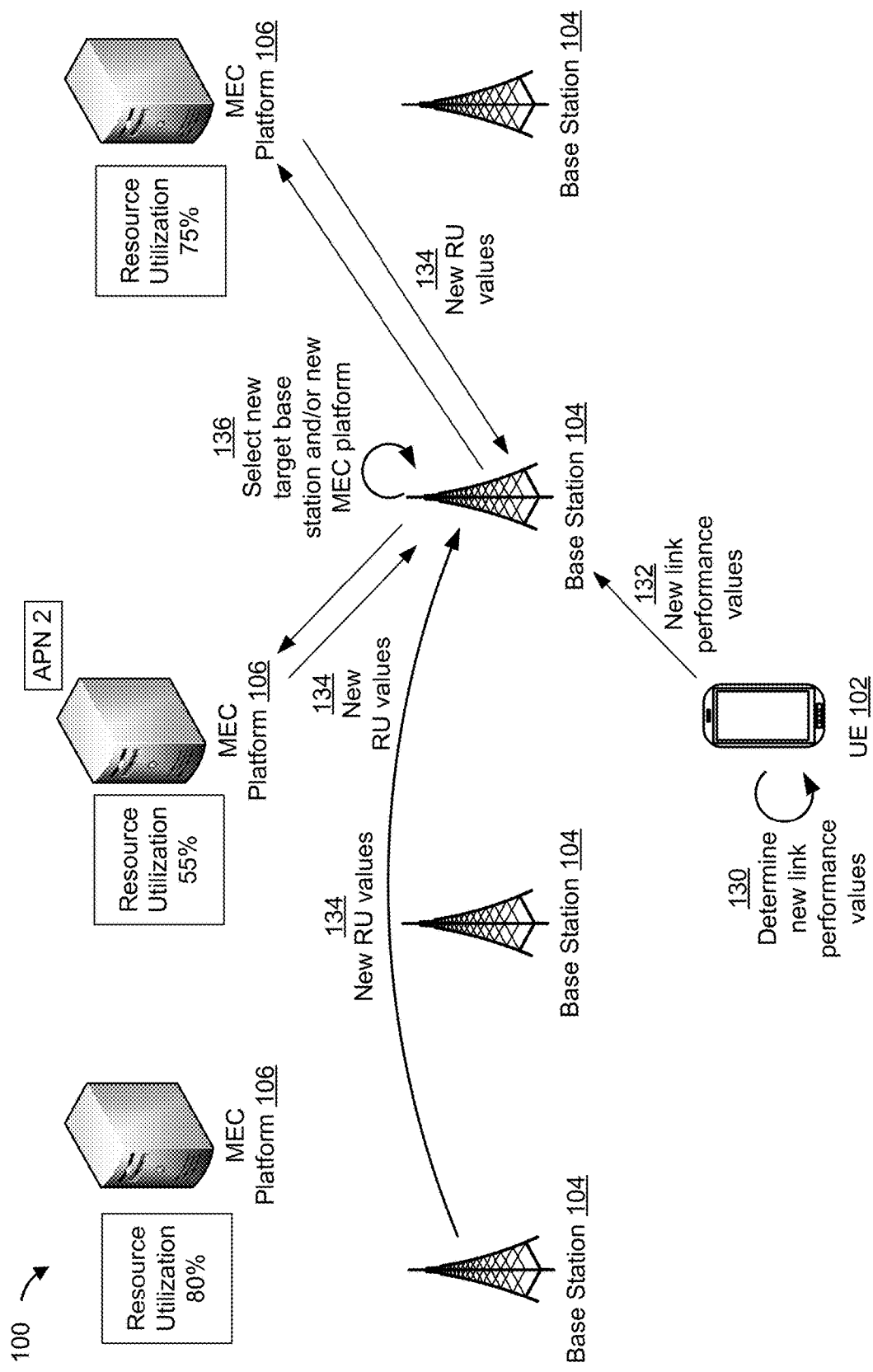
Figure 1F:
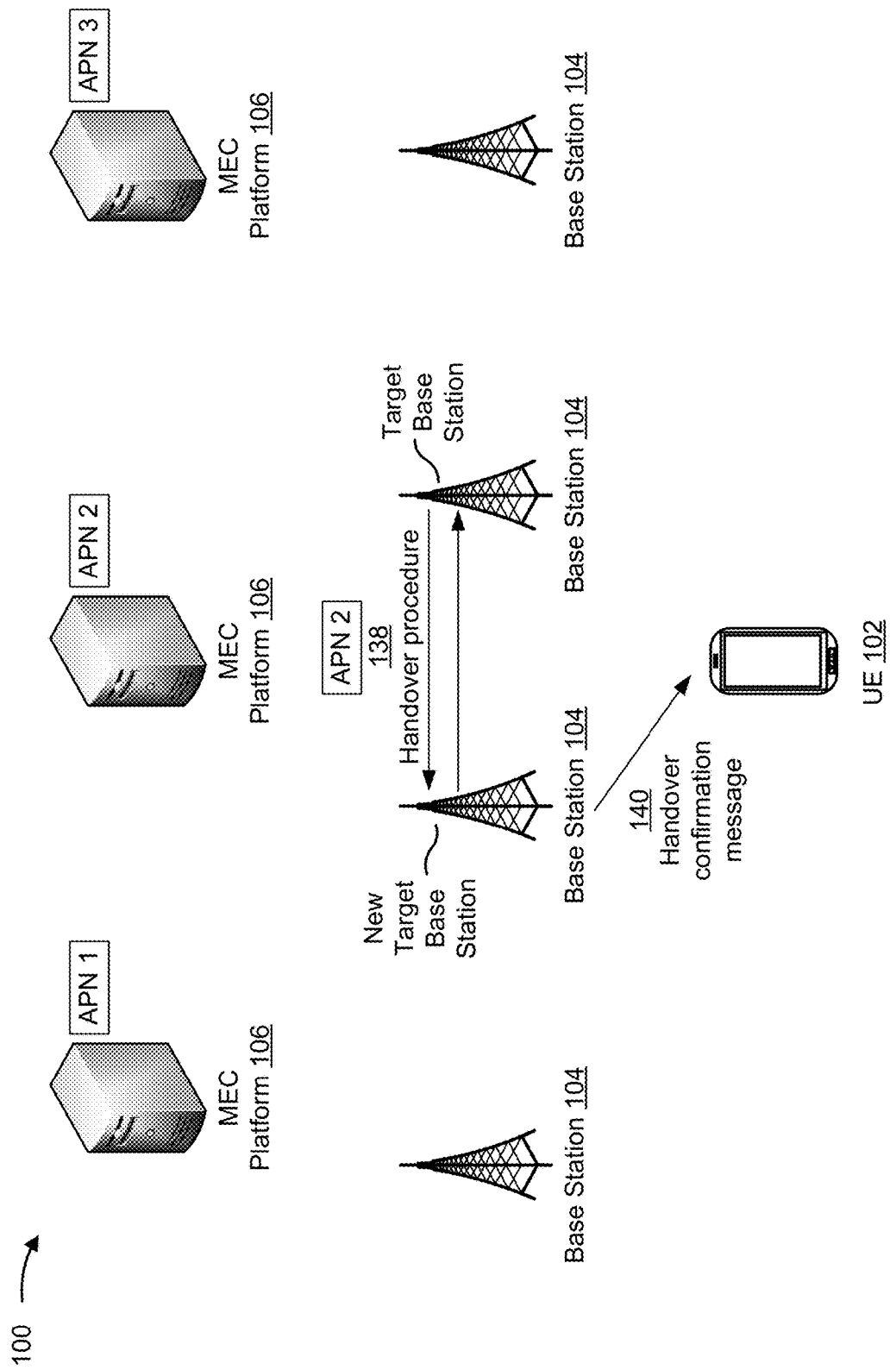

As shown in FIGS. 1E and 1F, a handover procedure may be performed that allows a new target base station 104 and/or a new target MEC platform 106 to be selected based on an analysis of a new set of RU values and/or a new set of link performance values.

As shown in FIG. 1E, and by reference number 130, UE 102 may determine the new set of link performance values, using one or more techniques described elsewhere herein. In some implementations, UE 102 may determine the new set of link performance values based on a trigger or a rule. For example, while UE 102 is moving throughout a service area of the wireless communication network, UE 102 may determine the new set of link performance values. UE 102 may determine the new set of link performance values at a particular time period, based on receiving the new set of RU values, based on receiving instructions from target base station 104, and/or the like. As shown by reference number 132, UE 102 may provide the set of new link performance values to target base station 104.

As shown by reference number 134, a new set of RU values may be provided to target base station 104. For example, target base station 104 may be able to request RU values from MEC platforms 106 that are linked to or a communication range of target base station 104 (e.g., MEC Platform B, MEC Platform C). This may cause the MEC platforms 106 that are linked to or in the communication range of target base station 104 to report the RU values. Additionally, or alternatively, other base stations that are in the group of base stations may obtain and report an RU value to target base station 104.

As shown as an example, a first MEC platform 106 (shown as a first MEC platform 106 in a row of three MEC platforms 106) may have an RU value indicating that 80% of resources are being utilized, a second MEC platform 106 (shown as a second MEC platform 106 in the row of three MEC platforms 106) may have an RU value indicating that 55% of resources are being utilized, and a third MEC platform 106 (shown as a third MEC platform 106 in the row of three MEC platforms 106) may have an RU value indicating that 75% of resources are being utilized.

In some implementations, as UE 102 moves within the service area, UE 102 may enter a communication range of a new target base station 104 and/or a new target MEC platform 106. In this case, new target base station 104 and/or new target MEC platform 106 may said to be part of the group of base stations 104 and the group of MEC platforms 106 that are described herein.

As shown by reference number 136, target base station 104 may select a new target base station 104 and/or a new target MEC platform 106. For example, target base station 104 may select a new target base station 104 and/or a new target MEC platform 106 based on an analysis of the new set of RU values and the new set of link performance values (e.g., using one or more techniques described elsewhere herein).

In some implementations (not shown), UE 102 (and not target base station 104) may select new target base station 104 and/or new target MEC platform 106. For example, the group of base stations 104 may be configured to report RU values to UE 102 at set intervals or time periods, periodically throughout the session, and/or the like. In this case, UE 102 may periodically determine the new set of link performance values and may select a new target base station 104 and/or a new target MEC platform 106, using one or more techniques described elsewhere herein. Additionally, UE 102 may provide target base station 104 with a message that includes information regarding new target base station 104 and/or new target MEC platform 106 (e.g., an identifier of new target base station 104, an identifier of new target MEC platform 106, and/or the like). In some implementations, UE 102 may provide target base station 104 with the message, and target base station 104 may analyze the message and determine whether to select new target base station 104 and/or new target MEC platform 106.

In this way, UE 102 or target base station 104 may select new target base station 104 and/or new target MEC platform 106 based on an analysis of the new set of RU values and the new set of link performance values.

As shown in FIG. 1F, and by reference number 138, target base station 104 may initiate a handover procedure with new target base station 104. For example, target base station 104 may initiate the handover procedure based on selecting new target base station 104 and/or new target MEC platform 106, based on receiving the message from UE 102 indicating to perform the handover procedure, based on analyzing the message received from UE 102 (e.g., which might simply provide information about new target base station 104 and/or new target MEC platform 106, but allow target base station 104 to make the determination as to whether to initiate the handover procedure), and/or the like. In this case, target base station 104 may provide new target base station 104 with an identifier of new target MEC platform 106 (shown as APN 2), the identifier of the destination device, and/or the like.

In some implementations, new target base station 104 may interact with the one or more devices of EPC layer 108 to complete the handover procedure. For example, new target base station 104 may provide the identifier to the MME (or another MME that is closer to new target base station 104) which may cause the MME to re-select an SGW and/or a PGW that are to support the session (e.g., if a closer or more optimal SGW or PGW are available).

As shown by reference number 140, new target base station 104 may provide a handover confirmation message to UE 102. The handover confirmation message may indicate that the handover procedure has been completed.

In this way, UE 102 (or a base station 104) intelligently selects a target base station 104 and a target MEC platform 106 based on an analysis of the resources available to the group of MEC platforms 106 and link performance of the links associated with the group of base stations 104. By intelligently selecting target base station 104 and target MEC platform 106, UE 102 (or the base station 104) ensures that target MEC platform 106 has a sufficient amount of resources available to support the session. This allows UE 102 to consistently offload processes of the MEC application to target MEC platform 106, thereby conserving resources (e.g., processing resources, network resources, and/or the like) that would otherwise be used to attempt to support the session without the resources of target MEC platform 106 (or without a portion of the resources of target MEC platform 106).

As indicated above, FIGS. 1A-1F are provided merely as an example. Other examples may differ from what was described with regard to FIGS. 1A-1F. For example, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple and/or distributed devices. Additionally, or alternatively, a set of devices (e.g., one or more devices) of example implementation 100 may perform one or more functions described as being performed by another set of devices of example implementation 100.

Figure 2:
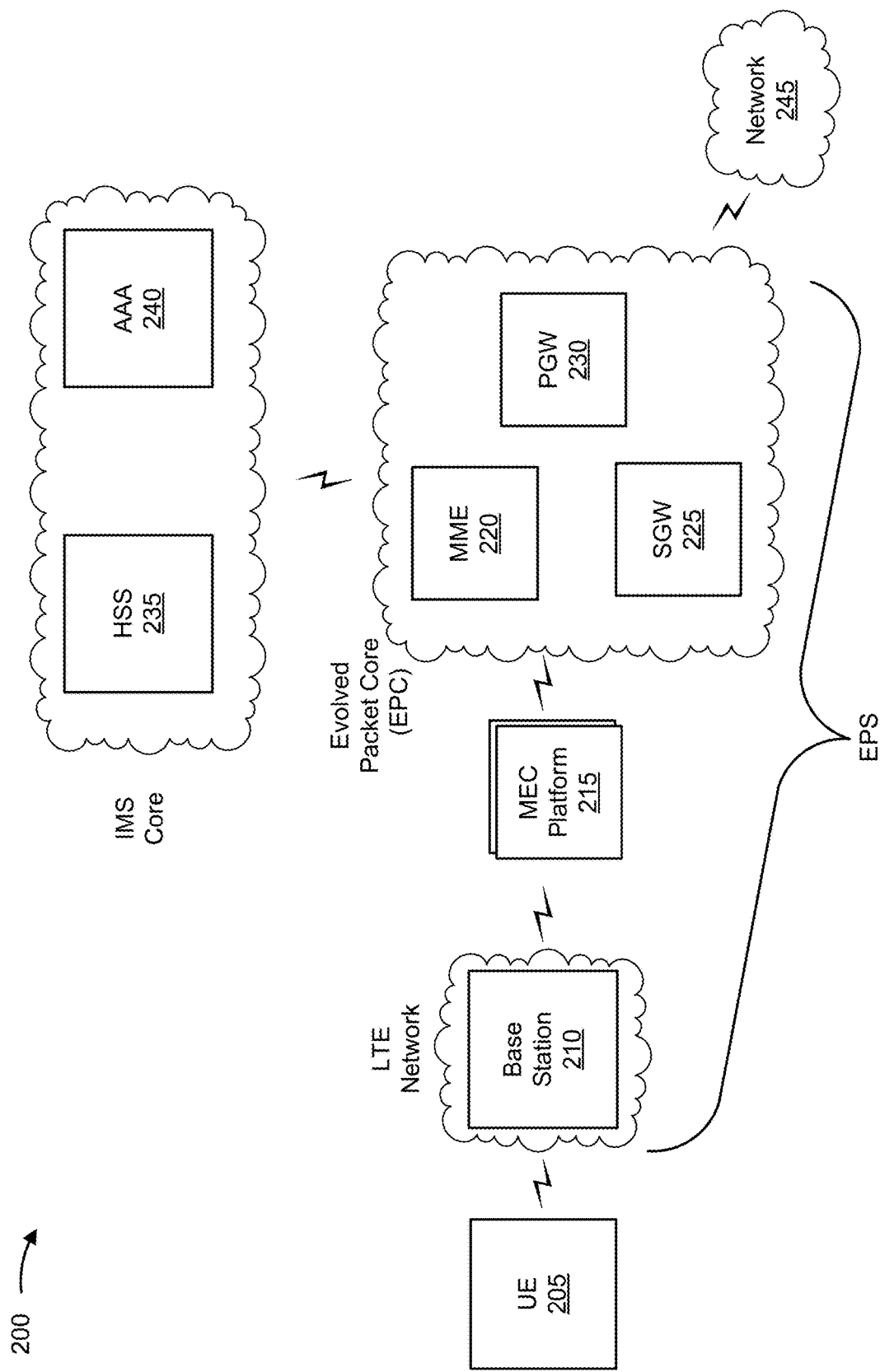
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user equipment (UE) 205, a base station 210, a multi-access edge computing (MEC) platform 215, a mobility management entity (MME) 220, a serving gateway (SGW) 225, a packet data network gateway (PGW) 230, a home subscriber server (HSS) 235, an authentication, authorization, and accounting server (AAA) 240, and/or a network 245. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a fifth generation (5G) network or a third generation (3G) network.

Environment 200 may include an evolved packet system (EPS) that includes an LTE network and/or an evolved packet core (EPC) that operate based on a third-generation partnership project (3GPP) wireless communication standard. The LTE network may include a radio access network (RAN) that includes one or more base stations 210 that take the form of evolved Node Bs (eNBs) via which UE 205 communicates with the EPC. The EPC may include MME 220, SGW 225, and/or PGW 230 that enable UE 205 to communicate with network 245 and/or an Internet protocol (IP) multimedia subsystem (IMS) core. The IMS core may include HSS 235 and/or AAA 240, and may manage device registration and authentication, session initiation, etc., associated with UE 205. HSS 235 and/or AAA 240 may reside in the EPC and/or the IMS core.

UE 205 may include one or more devices capable of communicating with base station 210 and/or a network (e.g., network 245). For example, UE 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, user equipment, and/or a similar device. UE 205 may be capable of communicating using uplink (e.g., UE to base station) communications, downlink (e.g., base station to UE) communications, and/or side link (e.g., UE-to-UE) communications. In some implementations, UE 205 may include a machine-type communication (MTC) UE, such as an evolved or enhanced MTC (eMTC) UE. In some implementations, UE 205 may include an Internet of Things (IoT) UE, such as a narrowband IoT (NB-IoT) UE and/or the like.

In some implementations, UE 205 may receive a set of resource utilization (RU) values from a group of base stations 210. In some implementations, UE 205 may provide a set of link performance values to base station 210. In some implementations, UE 205 may be configured to select a target base station 210 and a target MEC platform 215 based on an analysis of the set of RU values and the set of link performance values. In some implementations, UE 205 may provide a request to establish a session to base station 210. In some implementations, UE 205 may receive an indication from base station 210 that the session has been established. In some implementations, UE 205 may interact with a target MEC platform 215 to establish an amount of resources to dedicate to the session. In some implementations, UE 205 may send and/or receive traffic flow of the session from base station 210. In some implementations, UE 205 may receive a handover confirmation message from base station 210.

Base station 210 includes one or more devices capable of communicating with UE 205 using a cellular Radio Access Technology (RAT). For example, base station 210 may include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 210 may transfer traffic between UE 205 (e.g., using a cellular RAT), other base stations 210 (e.g., using a wireless interface or a backhaul interface, such as a wired backhaul interface), and/or network 245. Base station 210 may provide one or more cells that cover geographic areas. Some base stations 210 may be mobile base stations. Some base stations 210 may be capable of communicating using multiple RATs.

In some implementations, base station 210 may perform scheduling and/or resource management for UEs 205 covered by base station 210 (e.g., UEs 205 covered by a cell provided by base station 210). In some implementations, base stations 210 may be controlled or coordinated by a network controller, which may perform load balancing, network-level configuration, and/or the like. The network controller may communicate with base stations 210 via a wireless or wireline backhaul. In some implementations, base station 210 may include a network controller, a self-organizing network (SON) module or component, or a similar module or component. In other words, a base station 210 may perform network control, scheduling, and/or network management functions (e.g., for other base stations 210 and/or for uplink, downlink, and/or side link communications of UEs 205 covered by the base station 210). In some implementations, base station 210 may include a central unit and multiple distributed units. The central unit may coordinate access control and communication with regard to the multiple distributed units. The multiple distributed units may provide UEs 205 and/or other base stations 210 with access to network 245.

In some implementations, base station 210 may receive, obtain, determine, or identify an RU value. In some implementations, base station 210 may interact with one or more network devices of the EPC (e.g., MME 220, SGW 225, PGW 230, etc.) to establish a session of a MEC application. In some implementations, a first base station 210 may select a second base station 210 as a target base station 210. In some implementations, a first base station 210 may perform a handover procedure with a second base station 210. In this case, messages associated with the handover procedure may be transmitted or received via a communication interface, such as an Si interface or an X2 interface.

MEC platform 215 includes one or more devices capable of receiving, storing, processing, generating, and/or providing an RU value and/or information associated with a session of a MEC application. For example, MEC platform 215 may include a server device, a group of server devices, a desktop computer, a laptop computer, and/or a similar type of device. In some implementations, MEC platform 215 may host or share resources that support a MEC application (e.g., using cloud resources, such as one or more virtual network functions (VNFs), and/or the like). In some implementations, MEC platform 215 may be assigned a dedicated access point name (APN) to enable appropriate traffic routing to and/or from UE 205 and/or a destination device. In some implementations, MEC platform 215 may share a core APN if a local breakout feature is configured.

In some implementations, MEC platform 215 may be hosted in a location (e.g., a physical location, a virtual location, and/or the like) that is between base station 210 and the EPC. As used herein, a first device may be said to be hosted in a virtual location that is between a second device and a third device if the first device is an intermediary for traffic between the second device and the third device (e.g., even if a physical location of the first device is not between the second device and the third device). When MEC platform 215 is hosted in the location between base station 210 and the EPC, MEC platform 215 may interact with base station 210 via a communication interface such as an Si interface.

In some implementations, MEC platform 215 may be hosted as part of base station 210 or at a site associated with base station 210. In some implementations, MEC platform 215 may be hosted within the EPC (e.g., as a separate device in the EPC, as part of MME 220, SGW 225, PGW 230, and/or the like). In some implementations, MEC platform 215 may be hosted as part of a service access facility (SAF) (e.g., which may be located between base station 210 and the EPC). In some implementations, MEC platform 215 may be hosted at a location between the EPC and network 245 (e.g., further from an edge of a network, as is found in a traditional cloud computing architecture). In this case, MEC platform 215 may communicate with devices of the EPC via a communication interface such as an SGi interface.

MME 220 may include one or more devices, such as one or more server devices, capable of managing authentication, activation, deactivation, and/or mobility functions associated with UE 205. In some implementations, MME 220 may perform operations relating to authentication of UE 205. Additionally, or alternatively, MME 220 may facilitate the selection of a particular SGW 225 and/or a particular PGW 230 to serve traffic to and/or from UE 205. For example, MME 220 may receive an identifier of MEC platform 215 and may use the identifier to select a particular SGW 225 and/or a particular PGW 230 (e.g., by selecting a particular SGW 225 and/or a particular PGW 230 that is near MEC platform 215). MME 220 may perform operations associated with handing off UE 205 from a first base station 210 to a second base station 210 when UE 205 is transitioning from a first cell associated with the first base station 210 to a second cell associated with the second base station 210. Additionally, or alternatively, MME 220 may select another MME (not pictured), to which UE 205 should be handed off (e.g., when UE 205 moves out of range of MME 220).

SGW 225 may include one or more devices capable of routing packets. For example, SGW 225 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 225 may aggregate traffic received from one or more base stations 210 associated with the LTE network and may send the aggregated traffic to network 245 (e.g., via PGW 230) and/or other network devices associated with the EPC and/or the IMS core. SGW 225 may also receive traffic from network 245 and/or other network devices and may send the received traffic to UE 205 via base station 210. Additionally, or alternatively, SGW 225 may perform operations associated with handing off UE 205 to and/or from an LTE network.

PGW 230 may include one or more devices capable of providing connectivity for UE 205 to external packet data networks (e.g., other than the depicted EPC and/or LTE network). For example, PGW 230 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 230 may aggregate traffic received from one or more SGWs 225 and may send the aggregated traffic to network 245. Additionally, or alternatively, PGW 230 may receive traffic from network 245, and may send the traffic to UE 205 via SGW 225 and base station 210. PGW 230 may record data usage information (e.g., byte usage), and may provide the data usage information to AAA 240.

HSS 235 may include one or more devices, such as one or more server devices, capable of managing (e.g., receiving, generating, storing, processing, and/or providing) information associated with UE 205. For example, HSS 235 may manage subscription information associated with UE 205, such as information that identifies a subscriber profile of a user associated with UE 205, information that identifies services and/or applications that are accessible to UE 205, location information associated with UE 205, a network identifier (e.g., a network address) that identifies UE 205, information that identifies a treatment of UE 205 (e.g., quality of service information, a quantity of minutes allowed per time period, a quantity of data consumption allowed per time period, etc.), and/or similar information. HSS 235 may provide this information to one or more other devices of environment 200 to support the operations performed by those devices.

AAA 240 may include one or more devices, such as one or more server devices, that perform authentication, authorization, and/or accounting operations for communication sessions associated with UE 205. For example, AAA 240 may perform authentication operations for UE 205 and/or a user of UE 205 (e.g., using one or more credentials), may control access, by UE 205, to a service and/or an application (e.g., based on one or more restrictions, such as time-of-day restrictions, location restrictions, single or multiple access restrictions, read/write restrictions, etc.), may track resources consumed by UE 205 (e.g., a quantity of voice minutes consumed, a quantity of data consumed, etc.), and/or may perform similar operations.

Network 245 may include one or more wired and/or wireless networks. For example, network 245 may include a cellular network (e.g., a 5G network, a 4G network, such as an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
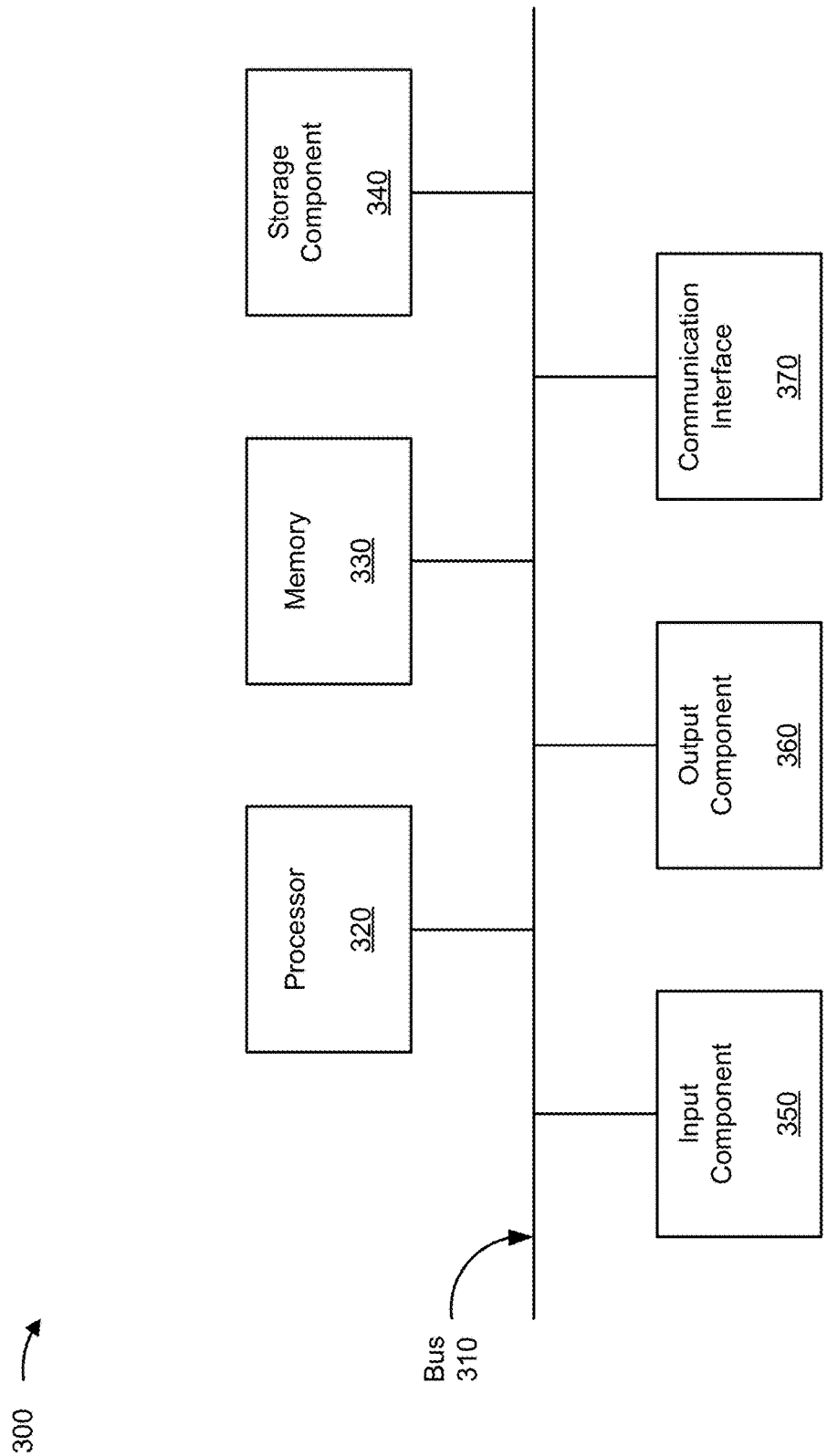
FIG. 3 is a diagram of example components of one or more devices of FIG. 2.

FIG. 3 is a diagram of example components of a device 300. Device 300 may correspond to UE 205, base station 210, MEC platform 215, MME 220, SGW 225, PGW 230, HSS 235, and/or AAA 240. In some implementations, UE 205, base station 210, MEC platform 215, MME 220, SGW 225, PGW 230, HSS 235, and/or AAA 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
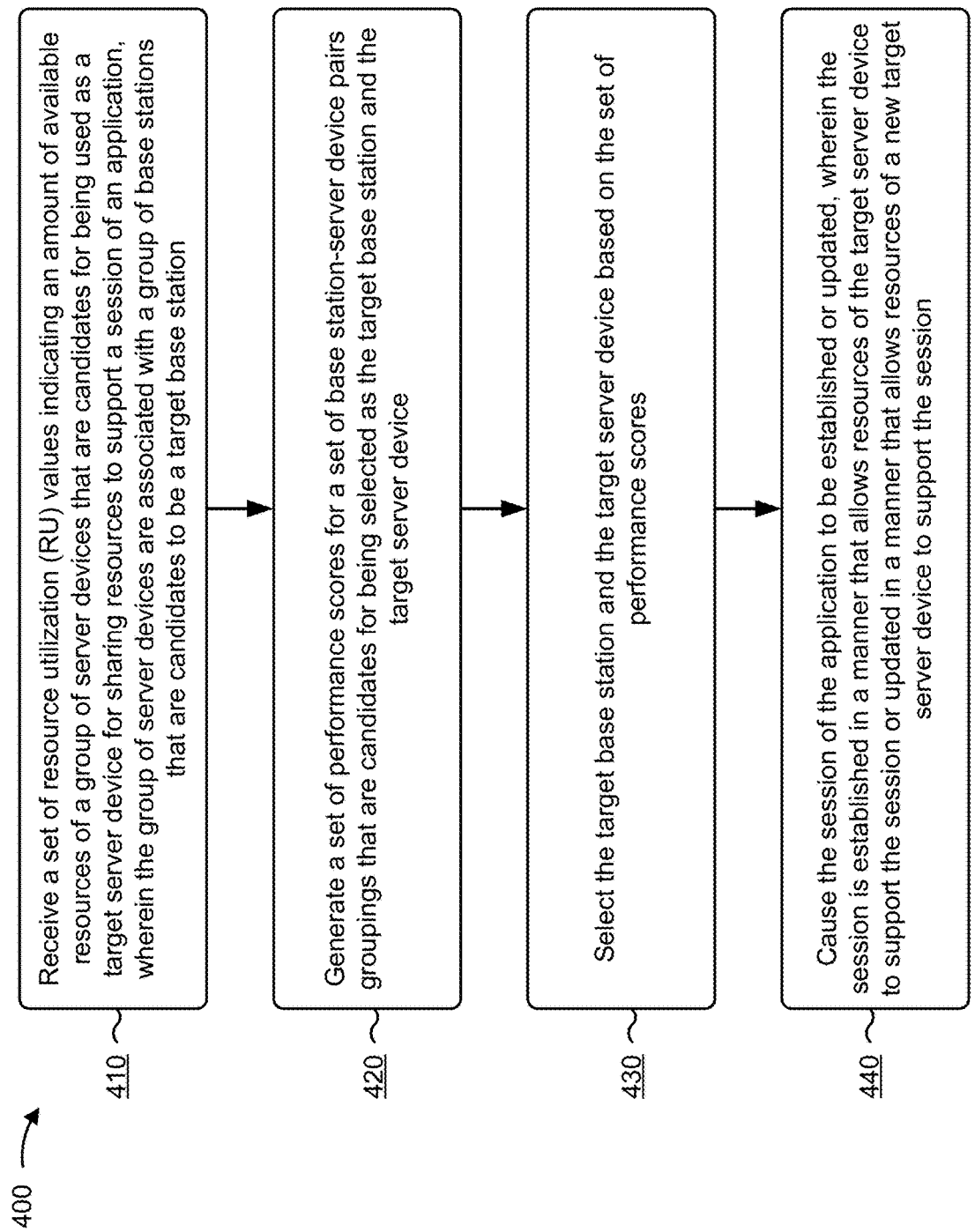
FIG. 4 is a flow chart of an example process for selecting a base station and a multi-access edge computing (MEC) platform that are to support a session of an application based on an analysis of network performance indicators.

FIG. 4 is a flow chart of an example process 400 for selecting a base station and a multi-access edge computing (MEC) platform that are to support a session of an application based on an analysis of network performance indicators. In some implementations, one or more process blocks of FIG. 4 may be performed by a wireless communication device (e.g., user equipment (UE), such as UE 205, a base station, such as base station 210, etc.). In some implementations, one or more process blocks of FIG. 4 may be performed by another device or a group of devices separate from or including the wireless communication device, such as a server device (e.g., a multi-access edge computing (MEC) platform, such as MEC platform 215), a mobility management entity (MME) (e.g., MME 220), a serving gateway (SGW) (e.g., SGW 225), a packet data network gateway (PGW) (e.g., PGW 230), a home subscriber server (HSS) (e.g., HSS 235), and/or an authentication, authorization, and accounting server (AAA) (e.g., AAA 240).

As shown in FIG. 4, process 400 may include receiving a set of resource utilization (RU) values indicating an amount of available resources of a group of server devices that are candidates for being used as a target server device for sharing resources to support a session of an application, wherein the group of server devices are associated with a group of base stations that are candidates to be a target base station (block 410). For example, the wireless communication device (e.g., using processor 320, memory 330, input component 350, communication interface 370, and/or the like) may receive a set of RU values indicating an amount of available resources of a group of server devices (e.g., a group of MEC platforms 215) that are candidates for being used as a target server device (e.g., a target MEC platform 215) for sharing resources to support a session of an application, as described above in connection with FIGS. 1A-1F. In some implementations, the group of server devices may be associated with a group of base stations (e.g., a group of base stations 210) that are candidates to be a target base station (e.g., a target base station 210). In some cases, the group of server devices may include MEC servers that are located within a wireless communication network (e.g., network 245, etc.).

The set of RU values may indicate an amount of resources that the group of server devices have available, an amount of resources available for supporting the session of the application, a total amount of resources being consumed by the group of server devices, and/or the like. The set of RU values may include a first value indicating a processing unit utilization rate for a server device (e.g., a central processing unit (CPU) utilization rate, a graphics processing unit (GPU) utilization rate, etc.), a second value indicating an amount of memory available to the server device, a third value indicating an amount of capacity available to the server device, a fourth value indicating an amount of latency associated with a connection to the server device, an overall RU value indicating an average and/or a weighted average of one or more of the other RU values, and/or the like.

In some implementations, the wireless communication device may be a UE. In this case, the wireless communication device may receive the set of RU values from the group of base stations.

In some implementations, the wireless communication device may be a base station. In this case, the wireless communication device may receive the set of RU values from the group of MEC platforms and/or from other base stations that are part of the group of base stations.

In some implementations, the wireless communication device (e.g., the UE, the base station, etc.) may receive a set of RU values while the session is already active. For example, the wireless communication device may receive the set of RU values while the session is active and may perform actions to determine whether the session needs to be supported by a new target base station and/or a new target server device, as described elsewhere herein.

As further shown in FIG. 4, process 400 may include generating a set of performance scores for base station-server device groupings that are candidates for being selected as the target base station and the target server device (block 420). For example, the wireless communication device (e.g., using processor 320, memory 330, and/or the like) may perform a scoring technique to generate a set of performance scores for base station-server device groupings that are candidates for being selected as the target base station and the target server device, as described above in connection with FIGS. 1A-1F.

In some implementations, prior to generating the set of performance scores, the wireless communication device (e.g., the UE) may determine a set of link performance values that are associated with links to the group of base stations. For example, the wireless communication device may determine set of link performance values for links between the wireless communication device and each base station of the group of base stations. The set of link performance values may include a reference signal received power (RSRP) value, a reference signal received quality (RSRQ) value, a signal-to-interference plus noise ratio (SINR) value, a receive signal strength indicator (RSSI) value, an average or weighted average of one or more of these values, and/or the like.

In some implementations, prior to performing the scoring technique, the wireless communication device (e.g., the base station) may receive the set of link performance values. For example, the UE may determine the set of link performance values and may provide the set of link performance values to the wireless communication device.

A base station-server device grouping, as used herein, may be a combination of one or more base stations and one or more server devices that are capable being selected as the target base station and the target server device. A base station and/or a server device may be capable of being selected as the target base station and/or the target server device if the base station and/or the server device are in a communication range of the UE, are within a threshold distance of the UE, and/or the like.

In some implementations, the wireless communication device may perform the scoring technique to generate the set of performance scores for the base station-server device groupings. For example, the wireless communication device may generate the set of performance scores based on a first set of scores indicating whether the set of RU values satisfied the threshold RU value, a second set of scores indicating a degree to which the set of RU values satisfy the threshold RU value, a third set of scores indicating whether the set of link performance values satisfied the threshold link performance value, a fourth set of scores indicating a degree to which the set of link performance values satisfy the threshold link performance value, a score (or a value) indicating an amount of resources that the target server device will have to share to support the session, a weighted combination of two or more of the above mentioned scores, and/or the like.

As an example, the wireless communication device may perform the scoring technique for a base station-server device pair that is part of the base station-server device groupings. In this example, the wireless communication device may determine a first score based on whether an RU value, of the set of RU values, satisfies a threshold RU value, and may determine a second score based on whether a link performance value, of the set of link performance values, satisfies a threshold link performance value. Additionally, the wireless communication device may generate a performance score, of the set of performance scores, based on a weighted combination of the first score and the second score.

In some implementations, the wireless communication device may perform the scoring technique while the session of the application is active. For example, assume the session is active and the wireless communication device receives the set of RU values and receives or determines the set of link performance values. In this case, the wireless communication device may perform the scoring technique to generate a set of scores that may be used to determine whether a handover procedure would be needed to select a new target base station and/or a new target server device.

As further shown in FIG. 4, process 400 may include selecting the target base station and the target server device based on the set of performance scores (block 430). For example, the wireless communication device (e.g., using processor 320, memory 330, and/or the like) may select the target base station and the target server device based on the set of performance scores, as described above in connection with FIGS. 1A-1F.

As an example, assume each grouping of base station and MEC platform is associated with a performance score. In this example, the wireless communication device may select a base station and a MEC platform that have a best-available performance score (e.g., a highest available score, a lowest available score, etc.).

As further shown in FIG. 4, process 400 may include performing one or more actions associated with a procedure to cause the session of the application to be established or updated, wherein the session is established in a manner that allows resources of the target server device to support the session or updated in a manner that allows resources of a new target server device to support the session (block 440). For example, the wireless communication device using (e.g., using processor 320, memory 330, input component 350, output component 360, communication interface 370, and/or the like) may perform one or more actions associated with a procedure (e.g., a connection procedure, a handover procedure, etc.) to cause the session of the application to be established, as described above in connection with FIGS. 1A-1F.

In some implementations, the session may be established in a manner that allows resources of the target server device to support the session. In some implementations, the session may be established in a manner that allows resources of a new target server device to support the session.

In some implementations, the wireless communication device (e.g., the UE) may provide a request to establish the session to the target base station to cause the target base station to interact with one or more network devices to establish the session. In this case, the request may include an identifier of the target server device. As an example, the UE may provide the request to the target base station, which may cause the target base station to interact with the MME to establish the session. In this example, the MME may use the identifier of the target server device to select an SGW and a PGW that are in a communication range of the target server device.

In some implementations, the wireless communication device (e.g., the base station) may receive a request from the UE to establish the session. The request may include the identifier of the target server device. In this case, the wireless communication device may provide the identifier of the target server device to one or more network devices to cause the session to be established in a manner that allows the resources of the target server device to support the session of the application.

In some implementations, the wireless communication device (e.g., the UE) may provide the target base station with information associated with a new target base station and/or a new target server device. For example, while the session is active, the wireless communication device may provide the information to the target base station to cause the target base station to initiate a handover procedure with a new target base station. In this case, the handover procedure may allow the new target base station and the new target server device to support the session. Additionally, the new target base station may provide the wireless communication device with an indication that the handover procedure has been completed.

In some implementations, the wireless communication device (e.g., the base station) may receive, from the UE, information associated with a new target base station and/or a new target server device. This may cause the wireless communication device to initiate a handover procedure with the new target base station. The handover procedure may allow the new target base station and the new target server device to support the session of the application.

Although FIG. 4 shows example blocks of process 400, in some implementations, process 400 may include additional blocks, fewer blocks, different blocks, and/or differently arranged blocks than those depicted in FIG. 4. Additionally, or alternatively, two or more of the blocks of process 400 may be performed in parallel.

Figure 5:
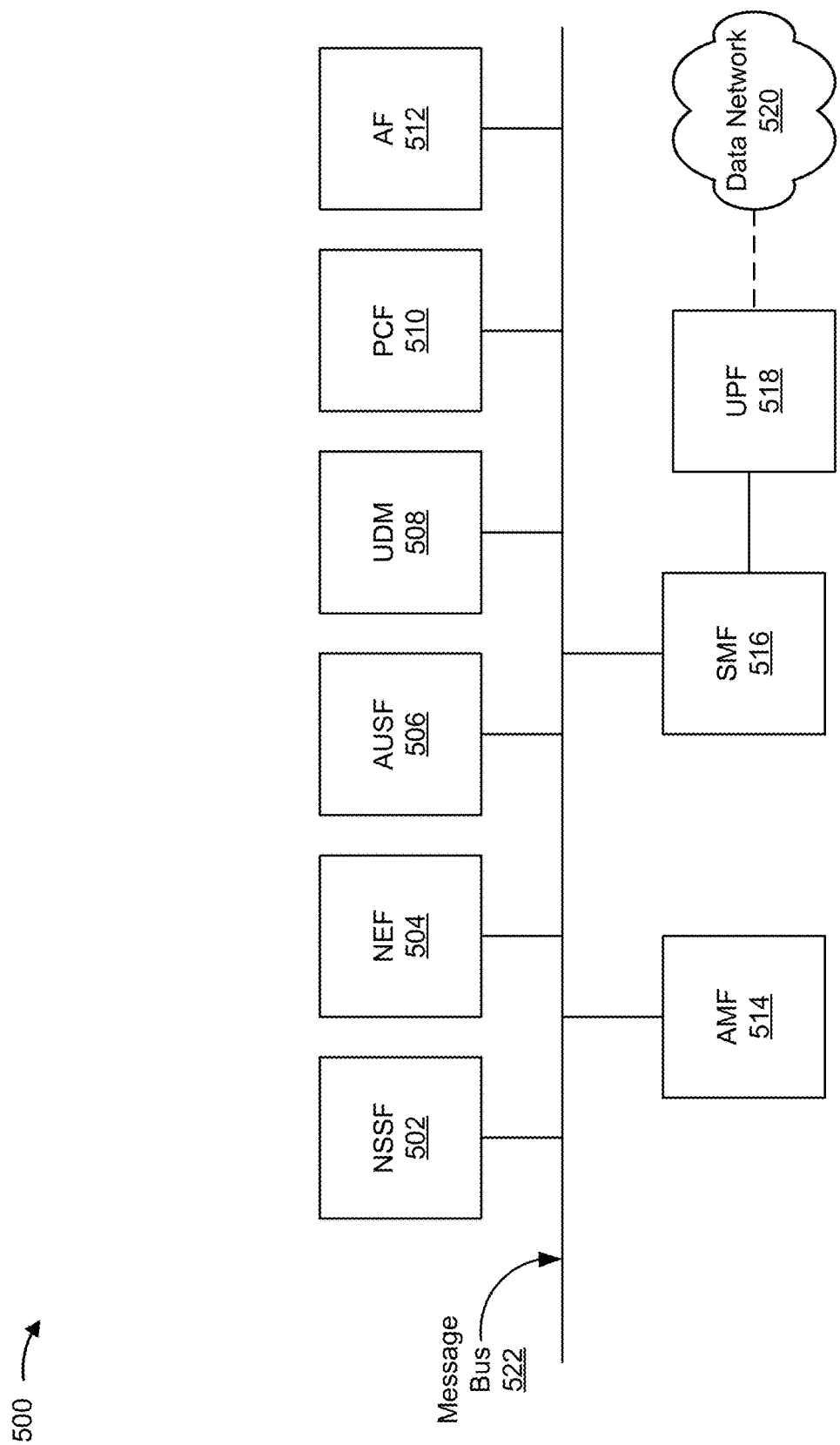
FIG. 5 is a diagram of an example functional architecture of an example core network described herein.

FIG. 5 is a diagram of an example functional architecture of a core network 500 in which systems and/or methods, described herein, may be implemented. For example, FIG. 5 may show an example architecture of a 5G NG core network included in a 5G wireless telecommunications system. In some implementations, the example architecture may be implemented by a core network (e.g., a core network described with respect to FIG. 6) and/or one or more of devices (e.g., a device associated with FIG. 3). While the example architecture of core network 500 shown in FIG. 5 may be an example of a service-based architecture, in some implementations, core network 500 may be implemented as a reference-point architecture.

As shown in FIG. 5, core network 500 may include a number of functional elements. The functional elements may include, for example, a network slice selection function (NSSF) 502, a network exposure function (NEF) 504, an authentication server function (AUSF) 506, a unified data management (UDM) component 508, a policy control function (PCF) 510, an application function (AF) 512, an access and mobility management function (AMF) 514, a session management function (SMF) 516, a user plane function (UPF) 518, a data network 520, and/or the like. These functional elements may be communicatively connected via a message bus 522. Each of the functional elements shown in FIG. 5 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 502 is a hardware-based element that may select network slice instances for UE's (and/or may determine network slice policies to be applied at a RAN). By providing network slicing, NSSF 502 allows an operator to deploy multiple substantially independent end-to-end networks potentially with the same infrastructure. In some implementations, each slice may be customized for different services. NEF 504 is a hardware-based element that may support the exposure of capabilities and/or events in the wireless telecommunications system to help other entities in the wireless telecommunications system discover network services.

AUSF 506 is a hardware-based element that may act as an authentication server and support the process of authenticating UEs in the wireless telecommunications system. UDM component 508 is a hardware-based element that may store subscriber data and profiles in the wireless telecommunications system. UDM component 508 may be used for fixed access, mobile access, and/or the like, in core network 500. PCF 510 is a hardware-based element that may provide a policy framework that incorporates network slicing, roaming, packet processing, mobility management, and/or the like.

AF 512 is a hardware-based element that may support application influence on traffic routing, access to NEF 504, policy control, and/or the like. AMF 514 is a hardware-based element that may act as a termination point for Non Access Stratum (NAS) signaling, mobility management, and/or the like. SMF 516 is a hardware-based element that may support the establishment, modification, and release of communications sessions in the wireless telecommunications system. For example, SMF 516 may configure traffic steering policies at UPF 518, enforce UE IP address allocation and policies, and/or the like.

UPF 518 is a hardware-based element that may serve as an anchor point for intra/inter-Radio Access Technology (RAT) mobility. UPF 518 may apply rules to packets, such as rules pertaining to packet routing, traffic reporting, handling user plane QoS, and/or the like. Data network 220 may include various types of data networks, such as the Internet, a third party services network, an operator services network, a private network, a wide area network, and/or the like. Message bus 522 represents a communication structure for communication among the functional elements. In other words, message bus 522 may permit communication between two or more functional elements.

The number and arrangement of functional elements shown in FIG. 5 are provided as an example. In practice, there may be additional functional elements, fewer functional elements, different functional elements, or differently arranged functional elements than those shown in FIG. 5. Furthermore, two or more functional elements shown in FIG. 5 may be implemented within a single device, or a single functional element shown in FIG. 5 may be implemented as multiple, distributed devices. Additionally, or alternatively, a set of functional elements (e.g., one or more functional elements) of core network 500 may perform one or more functions described as being performed by another set of functional elements of core network 500.

Figure 6:
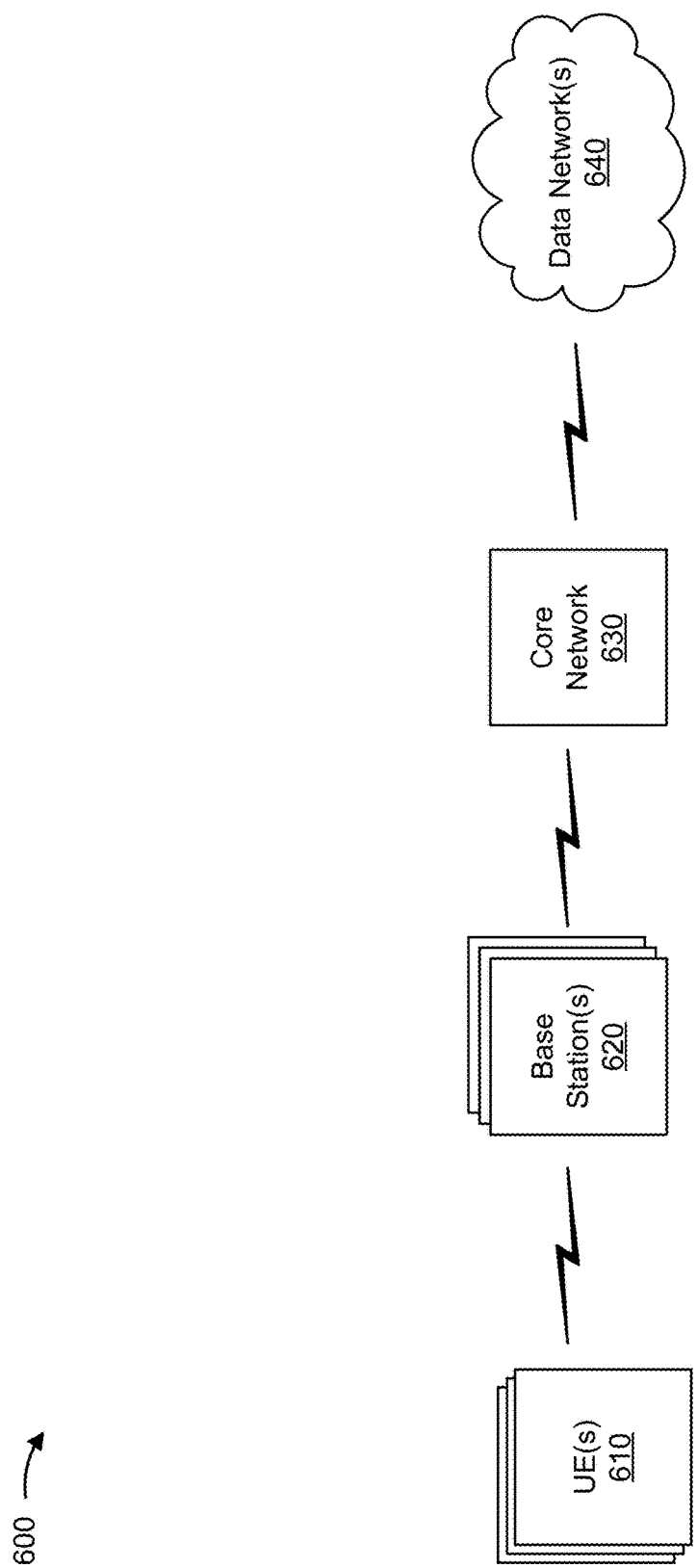
FIG. 6 is a diagram of an example environment in which systems, functional architectures, and/or methods, described herein, may be implemented.

FIG. 6 is a diagram of an example environment 600 in which systems, functional elements, and/or methods, described herein, may be implemented. As shown in FIG. 6, environment 600 may include one or more UEs 610, one or more base stations 620, a core network 630, and/or one or more data networks 640. Devices of environment 600 may interconnect via wired connections, wireless connections, or a combination of wired and wireless connections.

UE 610 includes one or more devices capable of communicating with base station 620 and/or data network 640 (e.g., via core network 630). For example, UE 610 may include a wireless communications device, a radiotelephone, a personal communications system (PCS) terminal (e.g., that may combine a cellular radiotelephone with data processing and data communications capabilities), a smart phone, a laptop computer, a tablet computer, a personal gaming system, a mobile hotspot device, a fixed wireless access device, a customer premises equipment, and/or a similar device. UE 610 may be capable of communicating using uplink (e.g., UE 610 to base station 620) communications, downlink (e.g., base station 620 to UE 610) communications, and/or sidelink (e.g., UE-to-UE) communications. In some implementations, UE 610 may include a machine-type communication (MTC) UE, such as an evolved or enhanced MTC (eMTC) UE. In some implementations, UE 610 may include an Internet of Things (IoT) UE, such as a narrow-band IoT (NB-IoT) UE and/or the like. In some implementations, UE 610 may be capable of communicating using multiple RATs.

Base station 620 includes one or more devices capable of communicating with UE 610 using a cellular RAT. For example, base station 620 may include a base transceiver station, a radio base station, a node B, an eNB, a gNB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. Base station 620 may transfer traffic between UE 610 (e.g., using a cellular RAT), other base stations 620 (e.g., using a wireless interface or a backhaul interface, such as a wired backhaul interface), and/or core network 630. Base station 620 may provide one or more cells that cover geographic areas. Some base stations 620 may be mobile base stations. Some base stations 620 may be capable of communicating using multiple RATs.

In some implementations, base station 620 may perform scheduling and/or resource management for UEs 610 covered by base station 620 (e.g., UEs 610 covered by a cell provided by base station 620). In some implementations, base stations 620 may be controlled or coordinated by a network controller, which may perform load balancing, network-level configuration, and/or the like. The network controller may communicate with base stations 620 via a wireless or wireline backhaul. In some implementations, base station 620 may include a network controller, a self-organizing network (SON) module or component, or a similar module or component. In other words, a base station 620 may perform network control, scheduling, and/or network management functions (e.g., for other base stations 620 and/or for uplink, downlink, and/or sidelink communications of UEs 610 covered by the base station 620). In some implementations, base station 620 may include a central unit and multiple distributed units. The central unit may coordinate access control and communication with regard to the multiple distributed units. The multiple distributed units may provide UEs 610 and/or other base stations 620 with access to data network 640 via core network 630.

Core network 630 includes various types of core network architectures, such as a 5G NG Core (e.g., a core network capable of being utilized by UPF 518 or other devices or components associated with FIG. 5), a long-term evolution (LTE) evolved packet core (EPC), and/or the like. In some implementations, core network 630 may be implemented on physical devices, such as a gateway, a mobility management entity, and/or the like. In some implementations, the hardware and/or software implementing core network 630 may be virtualized (e.g., through the use of network function virtualization and/or software-defined networking), thereby allowing for the use of composable infrastructure when implementing core network 630. In this way, networking, storage, and compute resources may be allocated to implement the functions of core network 630 (described in FIG. 5) in a flexible manner as opposed to relying on dedicated hardware and software to implement these functions.

Data network 640 includes one or more wired and/or wireless data networks. For example, data network 640 may include an IMS, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a wireless communication device, a set of resource utilization (RU) values indicating an amount of available resources of a group of server devices that are candidates for being used as a target server device for sharing resources to support a session of an application,
      wherein the group of server devices are associated with a group of base stations that are candidates to be a target base station used when establishing the session;
   generating, by the wireless communication device, a set of performance scores for base station-server device groupings that are candidates for being selected as the target base station and the target server device,
      wherein generating the set of performance scores comprises:
         determining, after receiving a set of RU values, a first score based on whether an RU value, of the set of RU values, satisfies a threshold RU value,
         determining a second score based on whether a link performance value, of a set of link performance values that are associated with links to the group of base stations, satisfies a threshold link performance value, and
         generating a performance score, of the set of performance scores, based on a weighted combination of the first score and the second score;
   selecting, by the wireless communication device, the target base station and the target server device based on the set of performance scores; and
   causing, by the wireless communication device, the session of the application to be established,
      wherein the session is established in a manner that allows resources of the target server device to support the session of the application.

2. The method of claim 1, wherein the group of server devices comprise multi-access edge computing (MEC) servers.

3. The method of claim 1, wherein the wireless communication device is a user equipment (UE) or the target base station.

4. The method of claim 1, wherein the wireless communication device is a user equipment (UE); and
   wherein causing the session to be established comprises:
      providing a request to establish the session to the target base station to cause the target base station to interact with one or more network devices to establish the session,
         wherein the request includes an identifier of the target server device.

5. The method of claim 1, wherein the wireless communication device is a first base station; the method further comprises:
   receiving the set of link performance;
   receiving, from a user equipment (UE), a request to establish the session,
      wherein the request includes an identifier of the target server device; and
   wherein causing the session of the application to be established comprises:
      providing the identifier of the target server device to a network device to cause the network device to establish the session in the manner that allows the resources of the target server device to support the application.

6. The method of claim 1, wherein the set of link performance values is a first set of link performance values, the set of RU values is a first set of RU values, and the set of performance scores is a first set of performance scores; and wherein the method further comprises:
   identifying, while the session is active:
      a second set of link performance values associated with the links to the group of base stations, and
      a second set of RU values indicating the amount of the available resources of the group of server devices;
   generating a second set of performance scores for the base station-server device groupings that are capable of being selected as the target base station and the target server device,
      wherein the second set of performance scores are based on the second set of RU values and the second set of link performance values;
   selecting a new target base station and a new target server device based on the second set of performance scores; and
   causing a handover procedure to be performed to permit the new target base station and the new target server device to support the session,
      wherein the handover procedure involves the new target base station receiving an identifier of the new target server device.

7. The method of claim 1, wherein the RU value includes at least one of:

a first value indicating a processing unit utilization rate,
a second value indicating an amount of available memory,
a third value indicating an amount of available capacity, or
a fourth value indicating an amount of latency.

8. A wireless communication device, comprising:
one or more memories; and
one or more processors, operatively coupled to the one or more memories, to:
receive, from a group of base stations that are in a communication range of the wireless communication device, a set of resource utilization (RU) values indicating an amount of available resources of a group of server devices that are capable of sharing resources to support a session of an application,
wherein the session is a first session that is capable of being established or a second session that is active;
determine a set of link performance values that are associated with links to the group of base stations;
generate a set of performance scores for base station-server device groupings that are capable of being selected as a target base station and a target server device for sharing the resources to support the session,
wherein the set of performance scores are based on the set of RU values and the set of link performance values that are associated with the links to the group of base stations;
select the target base station and the target server device based on the set of performance scores,
wherein the target base station and the target server device are to be selected for the first session or as a new target base station and a new target server device for the second session; and
perform, after selecting the target base station and the target server device, one or more actions based on whether the session is the first session or the second session,
wherein the one or more actions are to cause the first session to be established or cause a handover procedure to be performed in connection with the second session to allow the first session or the second session to be established in a manner that allows resources of the target server device or the new target server device to support the session of the application.

9. The wireless communication device of claim 8, wherein the group of server devices include multi-access edge computing (MEC) servers.

10. The wireless communication device of claim 8, wherein the one or more processors, when generating the set of performance scores, are to:
determine, after receiving the set of RU values, a first score based on whether an RU value, of the set of RU values, satisfies a threshold RU value,
determine a second score based on whether a link performance value, of the set of link performance values, satisfies a threshold link performance value, and
generate a performance score, of the set of performance scores, based on a weighted combination of the first score and the second score.

11. The wireless communication device of claim 8, wherein an RU value,
of the set of RU values, includes at least one of:
a first value indicating a processing unit utilization rate,
a second value indicating an amount of available memory,
a third value indicating an amount of available capacity, or
a fourth value indicating an amount of latency.

12. The wireless communication device of claim 8, wherein the one or more processors, when generating the set of performance scores, are to:
generate the set of performance scores based on the set of RU values, the set of link performance values, and a value indicating an amount of resources that the target server device is to share or is predicted to share when supporting the session.

13. The wireless communication device of claim 8, wherein the session is the first session; and wherein the one or more processors are further to:
determine, before generating the set of performance scores, the set of link performance values that are associated with the links to the group of base stations; and
wherein the one or more processors, when performing the one or more actions, are to:
provide a request to establish the session to the target base station to cause the target base station to interact with one or more network devices to establish the session,
wherein the request includes an identifier of the target server device.

14. The wireless communication device of claim 8, wherein the session is the second session; and wherein the one or more processors, when performing the one or more actions that cause the handover procedure to be performed in connection with the second session, are to:
provide the target base station with a message that includes information regarding the new target base station and the new target server device,
wherein the message causes the target base station to perform the handover procedure with the new target base station.

15. A non-transitory computer-readable medium storing instructions, the instructions comprising:
one or more instructions that, when executed by one or more processors of a wireless communication device, cause the one or more processors to:
receive, from a group of base stations that are in a communication range of the wireless communication device, a set of resource utilization (RU) values indicating an amount of available resources of a group of server devices that are capable of sharing resources to support a session of an application;
determine a set of link performance values that are associated with links to the group of base stations;
generate a set of performance scores for base station-server device groupings that are candidates for being selected as a target base station and a target server device for sharing the resources to support the session,
wherein the set of performance scores are based on the set of RU values and the set of link performance values that are associated with the links to the group of base stations;
select the target base station and the target server device based on the set of performance scores; and
provide a request to establish the session to the target base station to cause the target base station to interact with one or more network devices to establish the session,
wherein the request includes an identifier of the target server device.

16. The non-transitory computer-readable medium of claim 15, wherein the target server device includes a multi-access edge computing (MEC) server and is located within a wireless communication network that includes the group of server devices and the group of base stations.

17. The non-transitory computer-readable medium of claim 15, wherein the one or more instructions, that cause the one or more processors to generate the set of performance scores, cause the one or more processors to:
determine, after receiving the set of RU values, a first score based on determining that an RU value, of the set of RU values, satisfies a threshold RU value,
determine a second score based on determining that a link performance value, of the set of link performance values, satisfies a threshold link performance value, and
generate a performance score, of the set of performance scores, based on at least one of:
a weighted combination of the first score and the second score,
a value indicating a degree to which the RU value satisfies the threshold RU value, or
a value indicating a degree to which the link performance value satisfies the threshold link performance value.

18. The non-transitory computer-readable medium of claim 15, wherein an RU value, of the set of RU values, includes at least one of:
a first value indicating a processing unit utilization rate,
a second value indicating an amount of available memory,
a third value indicating an amount of available capacity, or
a fourth value indicating an amount of latency.

19. The non-transitory computer-readable medium of claim 15, wherein of the one or more instructions, that cause the one or more processors to generate the set of performance scores, cause the one or more processors to:
generate the set of performance scores based on the set of RU values, the set of link performance values, and a value indicating an amount of resources that the target server device is to share or is predicted to share when supporting the session.

20. The non-transitory computer-readable medium of claim 15, wherein the set of link performance values is a first set of link performance values, the set of RU values is a first set of RU values, and the set of performance scores is a first set of performance scores; and wherein the one or more instructions, when executed by the one or more processors, further cause the one or more processors to:
receive, while the session is active, a second set of RU values indicating the available resources of the group of server devices; and
wherein the one or more instructions, when executed by the one or more processors, further cause the one or more processors to:
determine, based on receiving the second set of RU values, a second set of link performance values that are associated with the links to the group of base stations,
generate a second set of performance scores for the base station-server device groupings that are capable of being selected as the target base station and the target server device,
select a new target base station and a new target server device based on the second set of performance scores, and
provide the target base station with a message that includes information regarding the new target base station or the new target server device,
wherein the message causes the target base station to perform a handover procedure with the new target base station.

* * * * *